United States Patent

Pettersen et al.

[11] Patent Number: 5,805,287
[45] Date of Patent: Sep. 8, 1998

[54] METHOD AND SYSTEM FOR GEOMETRY MEASUREMENTS

[75] Inventors: Alf Pettersen, Gjettum; Øyvind Røtvold, Hvalstad, both of Norway

[73] Assignee: Metronor AS, Nesbru, Norway

[21] Appl. No.: 769,800

[22] Filed: Dec. 17, 1996

Related U.S. Application Data

[63] Continuation of Ser. No. 373,253, Jan. 23, 1995, abandoned.

[30] Foreign Application Priority Data

May 24, 1993 [NO] Norway .................................. 931873

[51] Int. Cl.$^6$ .................................................. G01B 11/14
[52] U.S. Cl. ............................................................ 356/375
[58] Field of Search .............................. 306/375, 141.1, 306/152.1–152.3, 3.01–5.15, 376; 33/502, 503, 504, 554, 555, 556

[56] References Cited

U.S. PATENT DOCUMENTS

| | | | |
|---|---|---|---|
| 3,966,331 | 6/1976 | Inuiya | 356/375 |
| 4,402,608 | 9/1983 | Di Matteo et al. | 306/375 |
| 4,710,028 | 12/1987 | Grenier et al. | |
| 4,893,922 | 1/1990 | Eichweber | 356/1 |
| 5,196,900 | 3/1993 | Pettersen | 356/1 |
| 5,622,170 | 4/1997 | Schulz | 356/141.1 X |

FOREIGN PATENT DOCUMENTS

| | | | |
|---|---|---|---|
| 0534284 | 3/1934 | European Pat. Off. | |
| 3 145 823 | 5/1983 | Germany | |
| 5164517 | 6/1993 | Japan | 356/375 |
| 165046 | 12/1990 | Norway | |
| 169799 | 8/1992 | Norway | |
| 170368 | 10/1992 | Norway | |
| 456 454 | 10/1988 | Sweden | |
| 2075707 | 11/1981 | United Kingdom | 356/375 |
| 8909922 | 10/1989 | WIPO | |
| 9116598 | 10/1991 | WIPO | |
| WO94/21984 | 9/1994 | WIPO | 356/375 |

*Primary Examiner*—K Hantis
*Attorney, Agent, or Firm*—Pillsbury Madison & Sutro

[57] ABSTRACT

A method and system for determining the position and/or orientation of a number of objects relative to each other. At least two cameras having electro-optical sensors are provided. A network of help reference points is established. The positions of some points in the network relative to each other can be known or they are determined using at least one of the cameras positioned in multiple arbitrary locations. The positions of some of the objects relative to each other, are determined based on the determined positions of some of the points in the network. The position of at least one of the objects is determined by holding a probing tool in contact with a point on the object, and obtaining measurement data from the probing tool using at least two of the cameras.

49 Claims, 10 Drawing Sheets

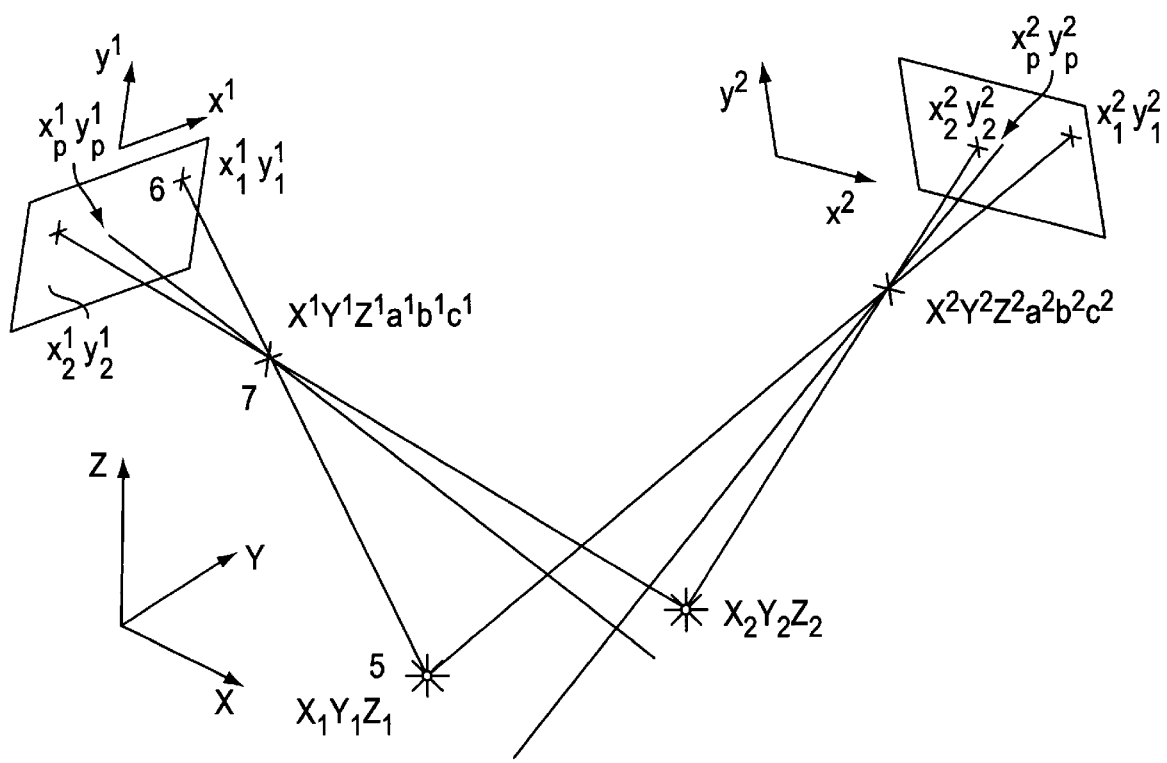

FIG. 8a
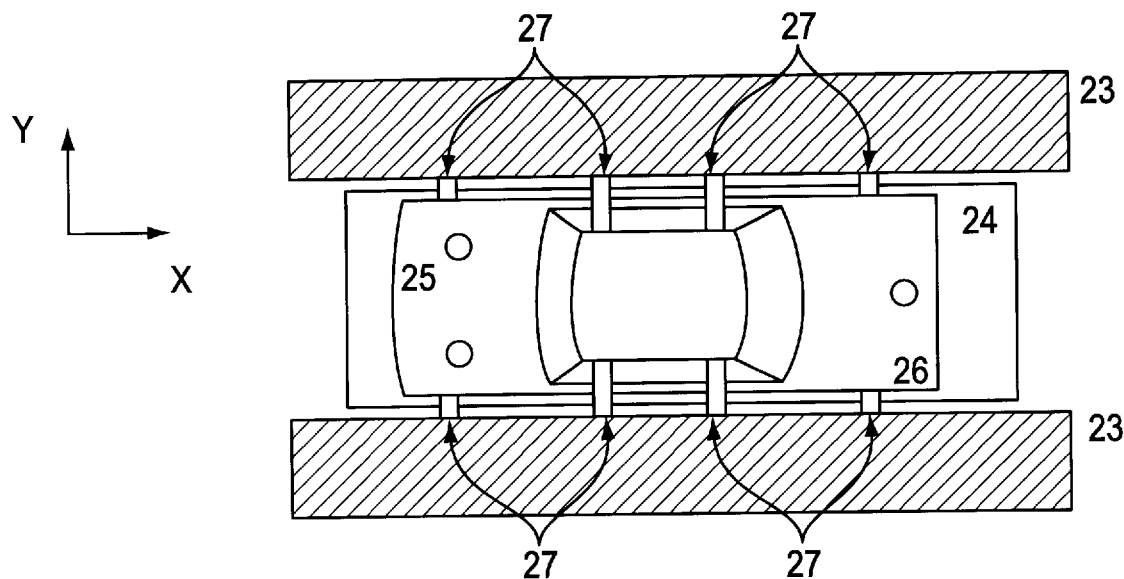
FIG. 8b
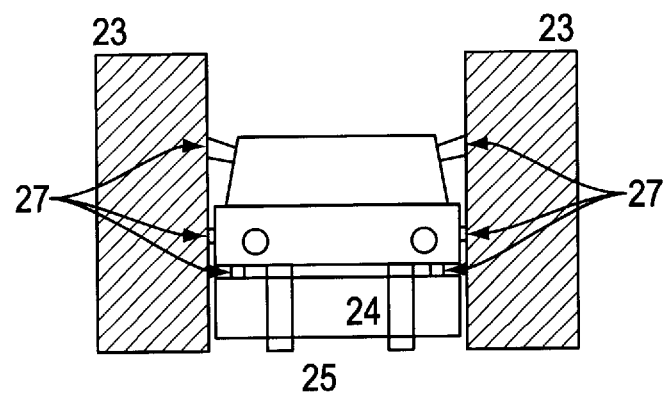
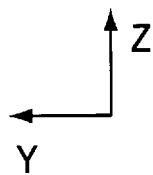

METHOD AND SYSTEM FOR GEOMETRY MEASUREMENTS

This is a continuation of application Ser. No. 08/373,253, filed on Jan. 23, 1995, which was abandoned upon the filing hereof.

BACKGROUND OF THE INVENTION

1. Field of the Invention

The present invention relates to a method, as well as a system for determination of relative position and/or orientation of a number of points or geometrical objects such as planes, lines, holes, cylinders or spheres and the like, or combined objects as robot arms or other industrial production equipment, based on the use of one or multiple cameras based on electro optical sensors in combination to fixed mounted light sources, projected light spots, illuminated reflectors or probing tools having light sources or reflectors attached thereto.

2. Background of the Invention

The present patent application describes a further development of the inventions described by the inventors in Norwegian patents 165 046, 164 946 and 169 799, as well as patent application 913994.

Norwegian patent 165 046 describes a system based on two high resolution electro-optical cameras which are calibrated for angle measurements, methods for such calibration, a system for geometry measurements based on the cameras, as well as application of this system.

Norwegian patent 164 946 describes systems for measurements of points on a surface, by projecting a pattern of light spots onto the surface, and by determining the coordinates for these light spots by the use of electro-optical sensors.

Norwegian patent 169 799 describes tools for marking points on a surface, to be measured by the use of electro optical cameras.

Norwegian patent application 913994 describes a system for measurement of spatial coordinates by the use of a single electro-optical cameras as well as tools having light source or reflecting points attached to it.

The system that is described in Norwegian patent 165 046 has limitations related to the fact that each individual point is registered simultaneous by two cameras. That leads to requirements for simultaneous free visibility in directions to both cameras. Furthermore the system is based on determination of the position of the cameras by a separate procedure before coordinate measurements can be started. The system accuracy is basically determined by the resolution of the sensor. This means that the accuracy is limited in large volumes.

The system described in Norwegian patent application 913994 functions essentially as a theodolite, in that spatial directions are determined with high accuracy. In addition the distance to the measurement tool is determined with moderate accuracy. As a stand alone system it gives limited accuracy in distance determination, which means that the number of possible applications is limited.

SUMMARY OF THE INVENTION

The present patent application describes a further development of method and means for coordinate measurement that gives full flexibility with respect to:

the number of cameras,
whether the cameras are calibrated for direction measurements or not,
the methods used for marking the measurement points,
where, and in how many positions the cameras are located during the measurement process, and
which methods that are used to relate the measurements to a selected coordinate system.

By the use of this further development full flexibility to optimize the system and the method with respect to the measurement task in question, and to questions like accuracy requirements and exterior limitations like visuality limitations is achieved.

Regarding applications, the system is competing with existing technology like theodolites and conventional photogrammetry, as well as mechanical coordinate measurement machines.

Coordinate measuring machines have strongly limited functionality, as they are not portable and have a limited measurement volume. Large machines are very expensive, have low accuracy, and require dedicated rooms due to the need for stability and temperature control.

Theodolites have significant limitations related to operator dependencies (in conventional instruments an operator is aiming towards the measurement point through the monocular of the theodolite), time consuming measurements, and to strong requirement for free visibility between the measurement point and the instrument. In addition theodolites must be levelled accurately.

Conventional photogrammetry is limited to the use of film based cameras. The measurement points are marked by attaching reflecting measurement elements called targets, to the object. It is not possible to measure geometrical objects like holes, planes, spheres, lines, etc. without marking these by the use of targets.

Calculation of spatial coordinates based on theodolite measurements or conventional photogrammetry is done by iterative methods. Both measurement methods are two dimensional, i.e. they give the direction towards the measurement points only. Estimated spatial coordinates for a number of the measurement points are needed as initial values for the iterative calculations. The system described in Norwegian patent application 913994 gives spatial coordinates, which gives sufficiently accurate initial values for the similar calculations related to the present method and system.

Norwegian patent no. 165 046 describes a fully automatic and accurately calibrated angle sensor based on CCD camera. Such a camera 1, as shown in FIG. 1a, comprises essentially a camera house 2, a lens unit 3, and a two dimensional sensor matrix 4. The lens unit is an objective with standard, spherical optics. The angle sensor is developed to measure the direction towards points being active light sources or points illuminated by active light sources. This giving a secure identification of the measurement points, and hence enables a fully automatic use, as well as gives a very high signal-to-noise ratio. High accuracy is furthermore ensured by the use of accurate procedure for calibration of the angle sensor. This is described in Norwegian patent 165 046.

The measurement principle is illustrated in FIG. 2. The coordinates for a number of points 5 shall be determined relative to a spatial coordinate system X, Y, Z. This is done by locating two or more cameras 4 in arbitrary and initially unknown positions and orientations relative to the same coordinate system. The spatial direction to a point 5 is determined by registering its projection 6 through the projection center 7 of the lens unit as shown in FIG. 1B. The projection is registered as the image coordinates x, y of the point image relative to a camera fixed coordinate system as illustrated in FIG. 2. The calculation of the unknown spatial coordinates is based on setting up the equations for the projections for a number of cameras. This calculation may also include determination of the position and orientation of the cameras, as well as including parameters for correction of possible lens distortions. This means that even non-calibrated cameras may be applied. Each additional point that is introduced in the calculation gives three additional unknown coordinates X, Y, Z to be determined, at the same time as 2×n new observations are included in the calculation (n is the number of camera locations). The calculation requires the distance of at least one distance between two points to be known to give correct scale information to the system of equations.

The method of calculation is based on minimizing errors (least squares method), such that redundant information is used. The necessary mathematical foundation is found in H. M. Kamara (Ed.): Non-topographic photogrammetry. Second Edition, 1987, page 37–55.

Generally, if the number of unknown parameters is increased, a similarly increased number of observations as additional points or additional cameras/camera locations is required.

FIG. 3 illustrates a system for spatial geometry measurements based on one or multiple cameras 1, 8, a system control unit 9 consisting of data processor 10, camera control unit 11 and light source control unit 12. The system can be attached to different light sources for marking points, such as, for example:

Reference bar 14 comprising a number of light emitting diodes at known mutual separation distances.

Light pen 15, which is a probing tool described in Swedish patent no. 456 454, possibly having exchangeable tools as described in Norwegian patent no. 169 799.

Light emitting diodes and/or lasers 16. Light emitting diodes are attached permanently in the measurement field to be imaged from multiple camera locations. Lasers are used to project fixed light spots onto the measurement object. Light emitting diodes/lasers are connected to the system via a connector unit 17.

Reflecting points 18 which are illuminated by a lamp 19.

Driving and control of the light sources is done by the control unit 12 to ensure optimum signal to noise ratio, and to synchronize to the cameras via the camera control unit 11.

The systems data processor 10 performs the analysis of measurement data from the cameras. The data processing mainly consist of:

control of imaging time and exposure time to optimize the signal to noise ratio, identification of the individual light sources, i.e. which point in the image corresponds to which light source, calculation of the spatial direction for each individual light source from the image information, calculation of spatial coordinates for the probing tool (light pen).

The user communicates with the system via an operator terminal 13.

In addition to the observations from the cameras, the method of calculation requires one or more known distances to give the correct scale to the calculated spatial coordinates. This can be achieved by the use of the specially designed reference bar 14, or by measuring points in a known separation distance. The length of the reference bar or the known distances may be entered by the operator at the terminal 13.

The present invention proposes to apply one or more cameras in combination with one or more types of light sources or illuminated reflecting points to achieve high flexibility to solve various measurement problems with respect to the dimension of the measurement volume, the accessibility to the measurement volume, definition of coordinate systems, accuracy requirements, available time for measurements, frequency of repeated controls, and combination of different types of cameras and instruments for direction measurements.

In one aspect, this invention is a method for determination of relative position and/or orientation of a number of points or geometrical objects like planes, lines, holes, cylinders or spheres and the like, or combined objects like robot arms or other industrial production equipment and the like, based on the use of one or more cameras based on electro-optical sensors, in combination with permanently mounted light sources, projected light spots, illuminated reflectors, or probing tools having light sources or reflectors attached thereto. The camera is mounted for measurement of the projection of light spots on the camera sensor in a number of camera locations. Measurements are made such that each light source or light reflection is observed from two or more camera locations, and the observations are registered as image coordinates related to a camera fixed coordinate system. Calculation of the image coordinates of the image of the touch point of the measurement tool in the camera fixed coordinate system, is based on the corresponding observed images of the light sources or reflecting points of the measurement tool.

There are, among the relevant measurement points, at least two points in a known mutual separation distance to be used for determination of a correct length scale.

The positions of the individual points relative to an arbitrary spatial coordinate system are calculated by a bundle adjustment, where the computational method also includes a mathematical modelling of the optical properties of the cameras to compensate for distortion errors in the camera lens.

The mathematical description of geometrical objects are based on analysis of a number of points on the object.

In some preferred embodiments of this invention, the method operates relative to a defined coordinate system. According to this aspect, a minimum of three points have one or more of their coordinate values known relative to the defined coordinate system such that a minimum of six coordinate values are known and distributed such that three values are defined relative to one coordinate axis, two relative to a second axis, and one relative to a third axis. These known coordinate values are used to calculate the position and orientation of all other points and geometrical objects relative to this defined coordinate system.

In preferred embodiments, the individual light spots are registered simultaneously by two or more cameras, and hence allow the light spots to move during measurements and/or to achieve faster data acquisition.

In some embodiments of this invention, a number of measurement points being active light sources, reflecting points or points to be measured by the use of a measurement tool having light sources or reflecting points attached thereto, are arranged as help reference points to increase the number of points and hence to increase the accuracy in the calculation of position and orientation of all points.

In some embodiments of this invention, a reference structure is arranged inside the measurement volume and to the reference structure are attached a number of active light sources, reflecting points or points to be measured by the use of a measurement tool having light sources or reflecting points attached thereto, and with known coordinates in a well defined coordinate system. Measurement and calculation of coordinates for additional points is based on measurement of a selection of points on the reference structure together with these additional points.

In other embodiments of this invention the measurement volume is surrounded by a reference structure having attached thereto a number of active light sources, reflecting points or points to be measured by the use of a measurement tool having light sources or reflecting points attached to it, and with known coordinates in a well defined coordinate system, and measurement and calculation of coordinates for points on an actual object is based on the object being position within the reference structure, and measurement of a selection of points on the reference structure together with these additional points.

In another aspect, this invention is a system for determination of relative position and/or orientation of a number of points or geometrical objects like planes, lines, holes, cylinders or spheres and the like, or combined objects like robot arms or other industrial production equipment and the like, based on the used of one or more cameras based on electro-optical sensors, in combination with permanently mounted light sources, projected light spots, illuminated reflectors, or probing tools having light sources or reflectors attached thereto.

The system includes means for flexible data acquisition, means for calculation of the image coordinates, means for giving scale information to the system, means for calculation of the position of the individual points, and means for mathematical description of geometrical objects.

The means for flexible data acquisition allows the camera to be mounted for measurement of the projection of light spots on the camera sensor in a number of camera locations, and where the data acquisition is made such that each light source or light reflection is observed from two or more camera locations, and that the observations are registered as image coordinates related to a camera fixed coordinate system.

The means for calculation of the image coordinates of the image of the touch point of the measurement tool in the camera fixed coordinate system, based on the corresponding observed images of the light sources or reflecting points of the measurement tool.

The means for giving scale information to the system, the means being a bar to which there is attached a minimum of two light sources, reflecting points or points to be measured by the use of the measurement tools, at known mutual separation distance.

The means for calculation of the position of the individual points relative to an arbitrary spatial coordinate system by bundle adjustment, and where the computational method also comprises the optical properties of the cameras to compensate for distortion errors in the camera lens.

The means for mathematical description of geometrical objects based on analysis of a number of points on the object.

In some embodiments, the system includes means based on a minimum of three points having one or more of its coordinate values known relative to the coordinate system, such that a minimum of six coordinate values are known and distributed such that three values are defined relative to one coordinate axis, two relative to a second axis, and one relative to a third axis, and for using these known coordinate values to calculate the position and orientation of all other points and geometrical objects relative to this coordinate system.

In some embodiments, the system includes means for synchronizing the activation of the individual light spots and the registering by two or more cameras, to allow the light spots to move during measurements and/or to achieve faster data acquisition.

In another aspect, this invention is a method for controlling the relative or absolute position and/or orientation of a number of fixed, movable or replaceable points and the like or geometrical objects like planes, lines, holes, cylinders or spheres and the like, within a limited measurement volume, based on optical measurements utilizing one or more cameras based on electro-optical sensors in combination to permanently mounted light sources, illuminated reflectors, or probing tools having light sources or reflectors attached thereto in known positions relative to the touch point of the probing tools.

A network of help reference points is established. The network consisting of additional measurement points such as active light sources, reflecting points or points to be measured utilizing the probing tool and the like, as well as existing fixed points or a geometrical objects which positions can be related to a physical point. The network is established for the purpose of achieving a sufficient density of the help reference points and thereby to improve the accuracy of the calculation of the positions and orientations of all points, or to simplify the final adjustment and control process.

Initially a measurement of the position of all points in the network is made. The measurement is done by locating of one or more cameras in a number of camera positions, such that for every camera position all or part of the measurement volume is within the field of view of one or more cameras. The following registrations are made for each camera position:

(i) the positions of permanently mounted light sources and light reflecting points are registered by their image on the sensors of the cameras, and whereby the position of the image is given as coordinates related to a camera fixed coordinate system; and (ii) the positions of fixed points or geometrical objects which positions can be related to a physical point, are registered by holding the probing tool in contact with the point and that the image of the touch point on the sensor of the camera is calculated from the observed images of the light sources or reflecting points of the probing tool.

This locating of cameras is repeated for a number of camera locations such that all points are registered in a minimum of two camera positions.

The relevant measurement points include at least two points for which the mutual separation distance is known to be used to determine the correct length scale.

The positions of each point are calculated relative to an arbitrary spatial coordinate system by bundle adjustment, wherein the calculation method may also include a mathematical modelling of the optical properties of the cameras to be used to compensate for image distortions occurring through the camera lens, and that the positions are stored in a data base for later use.

The positions and orientations of additional fixed or moveable points and geometrical objects thereafter are determined and may be adjusted by:

(a) locating a minimum of two cameras such that a minimum of three points or geometrical objects in known positions are within their field of view, as well as one or more points or geometrical objects for which the positions and/or orientations are to be determined;

(b) determining the position and orientation of the cameras from the already known point positions by registering the images of the points on the sensors of the cameras in the relevant camera positions by the method described above, and thereafter calculating the positions and orientations by the use of bundle adjustments;

(c) determining the unknown positions and orientations of subsequent points and geometrical objects based on the known positions and orientation of the cameras relative to the known network points; and adjusting, if necessary, the relevant point or geometrical object in a controlled way by measuring its position and orientation during and after the adjustment process, until the deviation between measured and nominal values are within acceptable limits.

The determining the unknown positions and orientations is done by the following methods depending on which type of point or geometrical object to be measured.

Permanently mounted, or moveable light sources or light reflecting points are registered by their image on the sensor of the cameras, whereby the image points are given as coordinates related to a camera fixed coordinate system, and their spatial positions relative to the positions of the known points are determined by bundle adjustment based on the image points as well as the position and orientation of the cameras.

The positions of selected points are determined by holding the probing tool in contact with the point, and that the light sources or reflecting points of the probing tool are registered by the camera sensors, whereby the image points are given as coordinates relative to a camera fixed coordinate system, and whereby the spatial position of the touch point relative to the positions of the known points is determined by bundle adjustment based on the image points as well as the position and orientation of the cameras, as well as information on the position of the touch point relative to the light sources or reflecting points of the probing tool.

The positions and orientations of geometrical objects are calculated from the positions of a number of points on the object, as well as a mathematical description of the relevant geometrical objects.

In some preferred embodiments, a number of the fixed points or geometrical objects define an object fixed coordinate system such that the position and orientation of all points and geometrical objects, including all help reference points, are determined relative to that coordinate system through a coordinate transformation.

In some embodiments, the scale information needed for a calculation of positions is achieved by arranging one or more reference bars within the measurement volume, the reference bars comprising in a known mutual separation distance a minimum of two light sources, reflecting points or fixed points that can be measured by utilizing the probing tool.

In some embodiments, the position of a number of help reference points, fixed points or geometrical objects and the like are known and stored in a database, such that control and adjustment of additional fixed, moveable or replaceable points or geometrical objects can take place directly by:

locating a minimum of two cameras such that a minimum of three points or geometrical objects in known positions are within their field of view, as well as one or more points or geometrical objects for which the positions and/or orientations are to be determined;

determining the position and orientation of the cameras from the already known point positions by registering the images of the points on the sensors of the cameras in the relevant camera positions by the method described above, and thereafter calculating the positions and orientations by the use of bundle adjustments; and determining the unknown positions and orientations of subsequent points and geometrical objects based on the known position and orientation of the cameras relative to the known network points. The determining is performed by the following methods, depending on which type of point or geometrical object to be measured:

Permanently mounted, or moveable light sources or light reflecting points are registered by their image on the sensor of the cameras, whereby the image points are given as coordinates related to a camera fixed coordinate system, and their spatial positions relative to the positions of the known points are determined by bundle adjustment based on the image points as well as the position and orientation of the cameras, The positions of selected points are determined by holding the probing tool in contact with the point, and that the light sources or reflecting points of the probing tool are registered by the camera sensors, whereby the image points are given as coordinates relative to a camera fixed coordinate system, and whereby the spatial position of the touch point relative to the positions of the known points is determined by bundle adjustment based on the image points as well as the position and orientation of the cameras, as well as information on the position of the touch point relative to the light sources or reflecting points of the probing tool.

The positions and orientations of geometrical objects are calculated from the positions of a number of points on the object, as well as a mathematical description of the relevant geometrical objects.

In some preferred embodiments, the help reference points are attached to a moveable object that can be brought to the measurement volume where control of points and geometrical objects is to take place, and where the positions and/or orientations of the these can be determined directly by utilizing the known position of the help reference points.

In some preferred embodiments, the points or geometrical objects are location and holding devices in different stations in a production line for production of cars or trucks and the like, and the object which has help reference points attached to it can be moved from station to station to ensure that all stations are controlled and adjusted on basis of the same set of known points.

In some preferred embodiments, the help reference points are permanently located within a measurement volume, and the points and geometrical objects which should be controlled and adjusted are attached to an object that can be brought to the measurement volume, where their positions and/or orientations can be determined directly based on the known positions of the help reference points.

In some preferred embodiments, the points or geometrical objects are control points on produced parts like cars, trucks, aircraft, trains and the like, or parts or sub-assemblies for these, and the measurement volume with permanently mounted help reference points are used for a quick determination of the camera locations, and hence for a quick control of the relevant control points.

BRIEF DESCRIPTION OF THE DRAWINGS

The characteristic features of the invention are described in the accompanying patent claims, as well as in the following description of non-limiting examples of use of the invention, with reference to the enclosed drawings.

FIG. 2 illustrates the principle of coordinate determination from the imaging of a common point in two or more cameras.

FIGS. 8a and 8b illustrates a permanent measurement station based on a reference structure.

DETAILED DESCRIPTION OF THE PRESENTLY PREFERRED EXEMPLARY EMBODIMENTS

The computation method that is described above and that is related to FIG. 2, is based on the possibility of seeing the same point from a number of different camera positions. Generally light sources, generated by direct emission from a light emitting diode or indirect as a reflection from a reflecting material or a projected laser spot, can be seen from "one side" only. Optimum accuracy in the computation method is achieved if the directions of observations are uniformly distributed. This is achieved by the light pen.

Figure 4A:
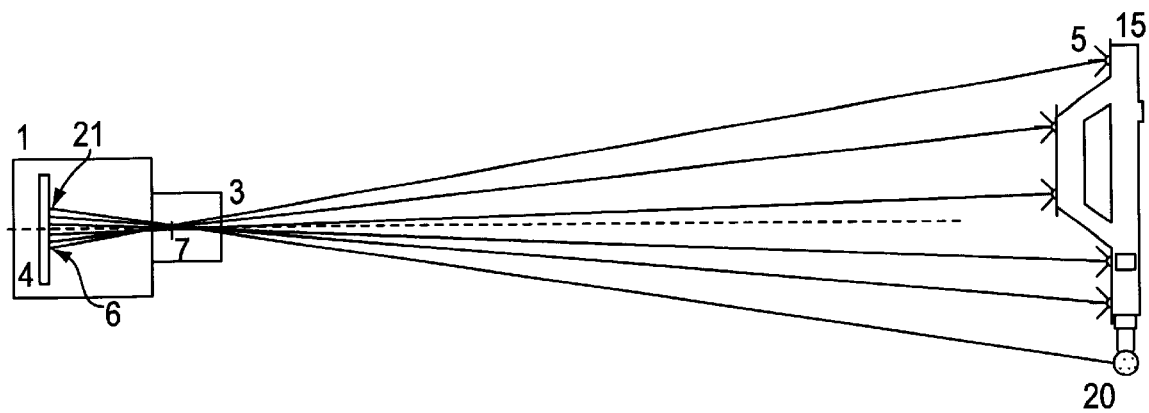
FIGS. 4a and 4b illustrates the further developed principle for the use of the probing tool "light pen".
Figure 4B:
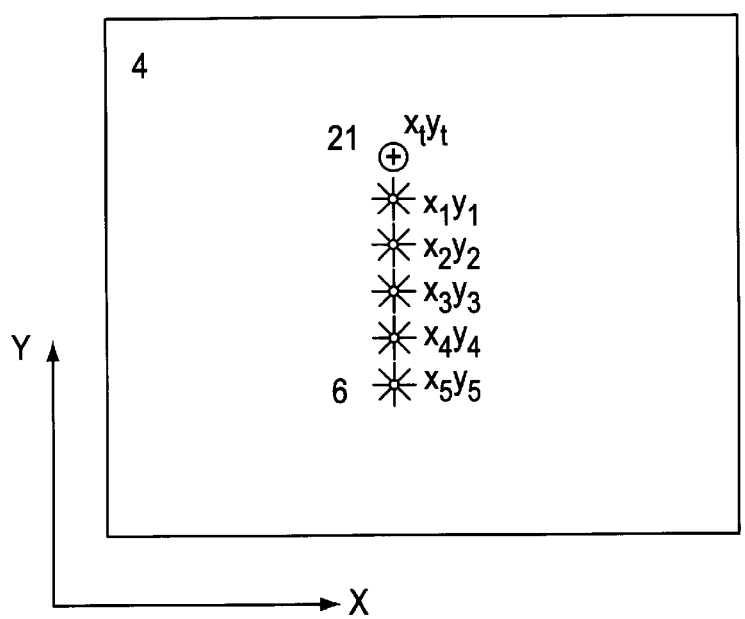

The light pen 15 that by itself is known from Norwegian patent application 913994, is in this context used differently as only the direction to the touch point of the light pen is to be registered and to be used for coordinate determination. The principle for use of the light pen is shown in FIGS. 4a and 4b. The light pen is registered on the sensor as a number of image spots 6 corresponding to the light emitting diodes 5. The direction to the light pen should be related to a touch point 20. This corresponds to an image point 21 on the sensor. As the sensor is registering the image of light sources only, this are a virtual image spot. The image coordinates of the image point 21 will be calculated from the registered image coordinates for each light source, as well the knowledge of the mutual position of the light sources 5 and the touch point 20 in a probe fixed, local coordinate system. The calculation methods are further described in Norwegian patent application 913994.

If the touch point of the light pen is kept in a fixed position, the light pen itself can be rotated to be aimed towards the different camera positions in question. Hence, this gives the necessary geometry for the computation method. The fact that the light pen has a number of light emitting diodes makes the accuracy in determining the projection of the touch point better than for a single light emitting diode.

Figure 5:
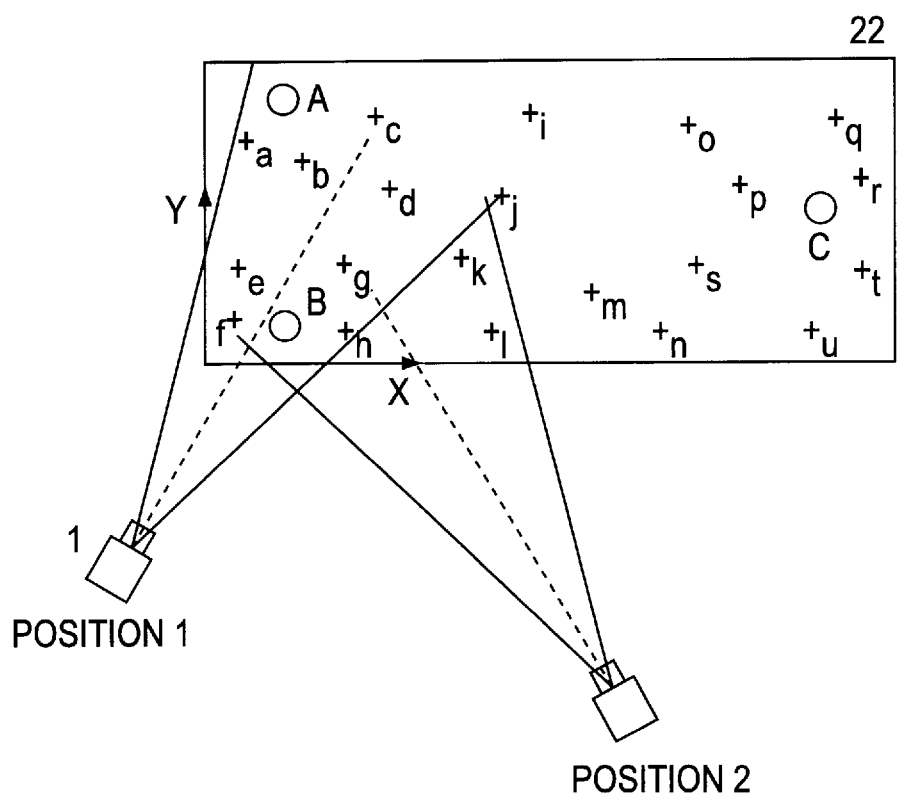
FIG. 5 illustrates how to establish and measure a network of help reference points.

FIG. 5 illustrates the use of the system to determine the geometry of an object 22 The positions of a number of points or geometrical objects (holes, planes, cylinders etc.), in the figure marked with capital letters A–C, are to be determined with high accuracy relative to the resolution of the cameras, the size of the measurement volume, its accessibility etc. The method consist of distributing a number of help reference points (in the figure marked with lower case letters a–u) all over the measurement volume. These can be light emitting diodes, projected laser spots, reflecting points or marked points that can be touched with the light pen. By registering the projection of these points on the camera sensors for a number of different camera locations, this will give data for calculation of the mutual position of all points, as described above with reference to FIG. 2. The computation is flexible with respect to:

the number of cameras or camera locations,
the number of points observed in each camera location (a minimum number is required, depending on the number of camera parameters to be determined), and
the number of observations for each individual point.

In general the accuracy is improved if the number of observations (points) in each camera location is increased, and if the number of camera locations is increased. A single camera or multiple cameras can be used. If the cameras are not calibrated with respect to the imaging properties of the lens, it is advantageous to have as few different cameras as possible.

If, on the other hand, it is necessary to do the measurements quickly, the data acquisition can be made efficient by using multiple, calibrated cameras in fixed locations, and by using as few locations and points as possible.

The relation to an object fixed coordinate system requires some points that are defining the coordinate system by their coordinate values being known along one or more of the coordinate axes, or by doing a best fit of defined values to the calculated positions.

Figure 6:
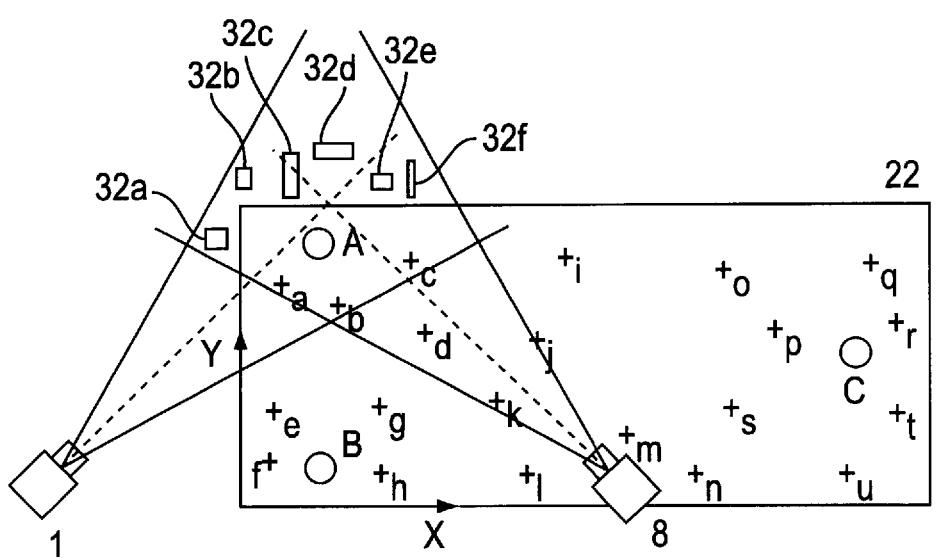
FIG. 6 illustrates measurement of a number of geometrical objects based on a number of help reference points.

FIG. 6 illustrates how to start from a number of points in known positions relative to an object fixed coordinate system and then to measure additional points within or outside the object (on objects 32a–32f by the use of two or more cameras. If a network of points is available, as shown by letters a–u, it is possible by the use of only two cameras 1, 8 to locate these such that they are seeing not more than the area of interest. At first the position and orientation of the cameras relative to the object fixed coordinate system are determined by registering the projection of the known points a, b, c. The coordinates of these points relative to the coordinate system X, Y are known from a measurement as described above with reference to FIG. 5. This method gives a quick measurement, having a high accuracy.

Figure 7A:
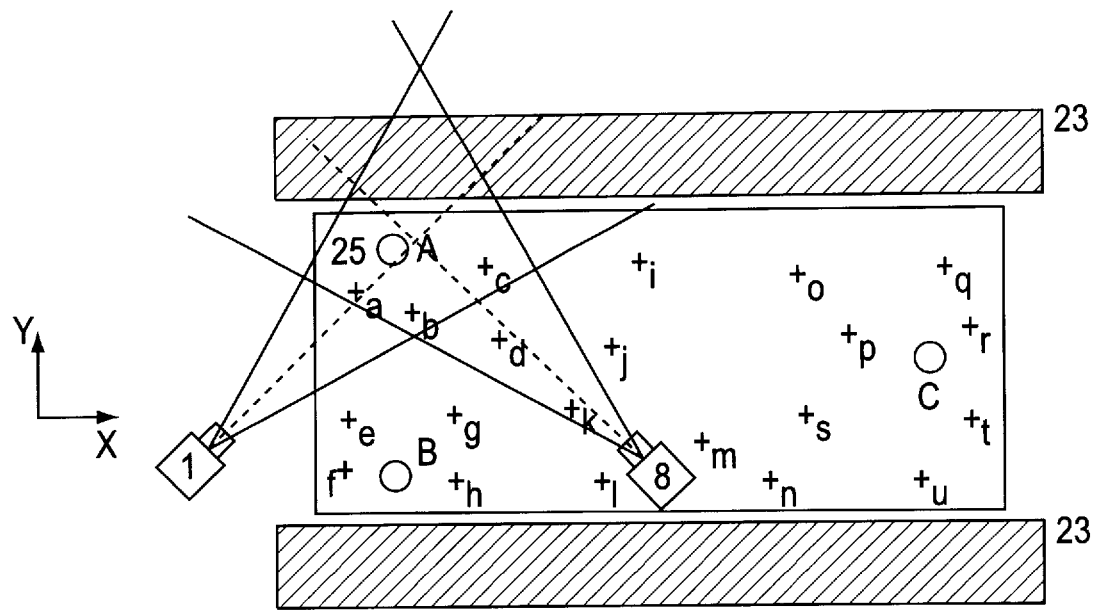
FIGS. 7a and 7b illustrates an application based on a transportable reference structure/pallet.
Figure 7B:
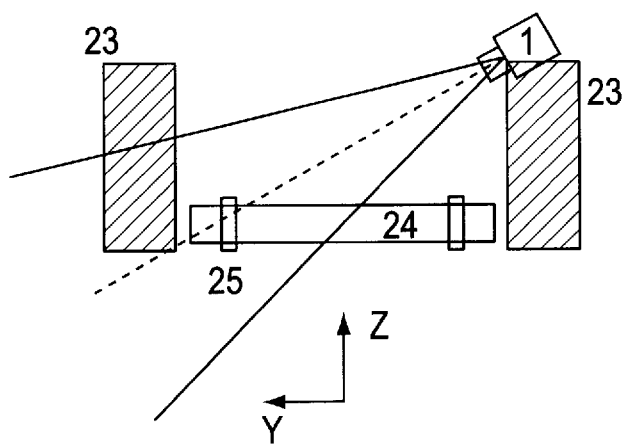

An application of this method is illustrated in FIGS. 7a and 7b, which as an example may describe a welding station in a production line for car bodies as shown in FIGS. 8a and 8b. The under part of the car body is based on a fixture 24, while the side parts of the car body are held in place by fixtures 23. The mount of the car body parts to the fixtures are made by the use of steering pins and clamping mechanisms 27. These are controlling the location of each different component during the welding process, and have to be in the correct location to ensure correct shape of the assembled car body. Control of each individual object is efficiently made by the method described above (FIG. 6) by having a number of fixed help reference points distributed all over the whole station. An alternate solution is shown in FIG. 7a, where the help reference points a–u are attached to a portable jig 24 that can be moved into the station when a measurement is to be made. The location of this jig is in such a case controlled by the main references 25, 26 of the station (e.g. steering pins) that are holding the jig in a fixed position. The positions and orientations of the two cameras 1, 8 relative to the object fixed coordinate system are first determined by registering the directions towards the known points a–u. The advantages of this method is that each individual station in the whole production line is based on a single jig with a fixed and well known geometry, such that a unique, accurate geometry is ensured all along the production line. Hence, the error propagation through the production line is kept to a minimum. Furthermore, it will not be necessary to have an extensive network of points in each individual station.

Figure 9:
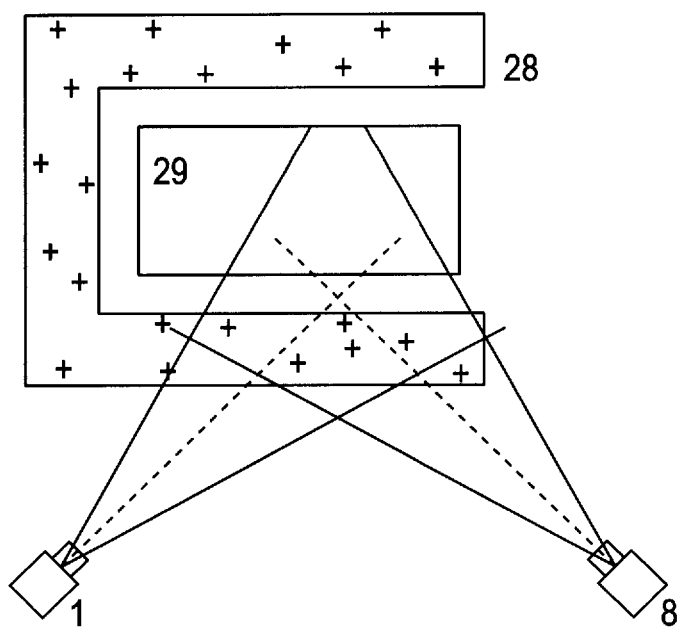
FIG. 9 depicts an application of the method of FIGS. 7a and 7b wherein reference points are permanently mounted on a structure.

FIG. 9 shows another application of the same principle. In this case the reference points are permanently mounted in a structure 28, while the object 29 to be measured is transported into this structure. As an example this method can be applied in a production line based on transportable jigs for transport of components into the welding stations. Control of these jigs on a regular basis can be done in fixed measurement stations.

Figure 10:
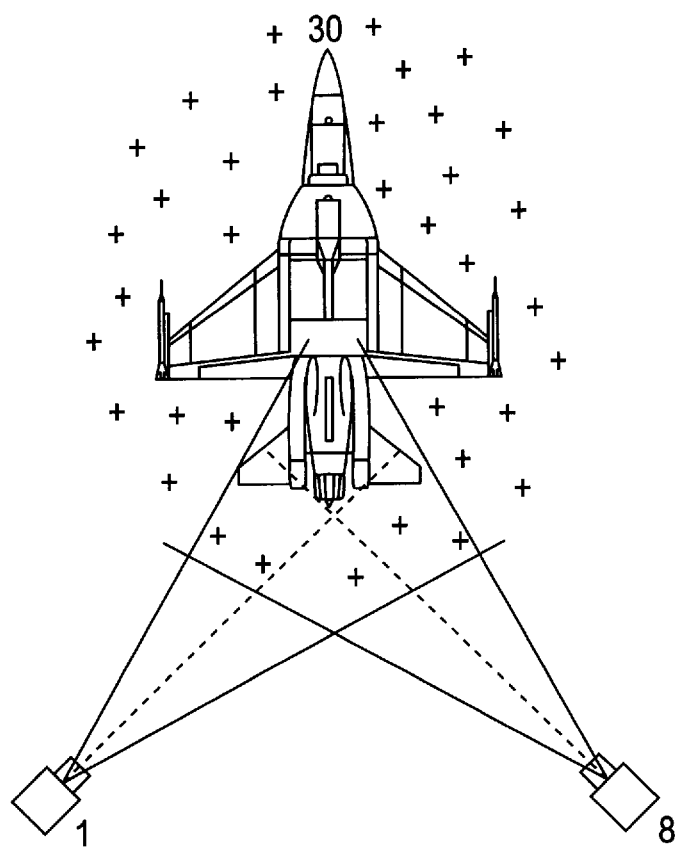
FIG. 10 depicts an example of marking points at a measurement station.

FIG. 10 shows an example of this, where the object 30 is an aircraft that is brought to a measurement station where the reference points are placed on the floor or in a surrounding fixture.

Figure 1A:
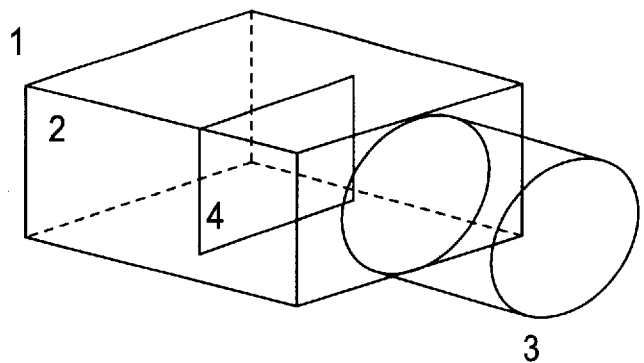
FIGS. 1a and 1b illustrate camera and imaging of a light spot on the sensor of the camera.
Figure 1B:
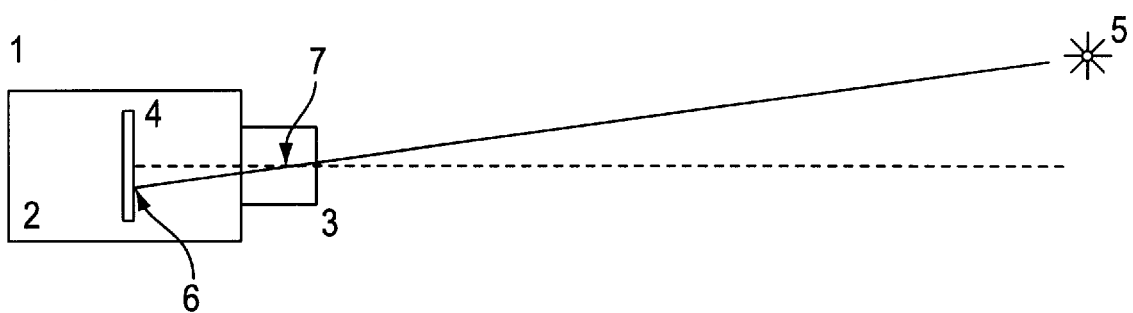
Figure 3:
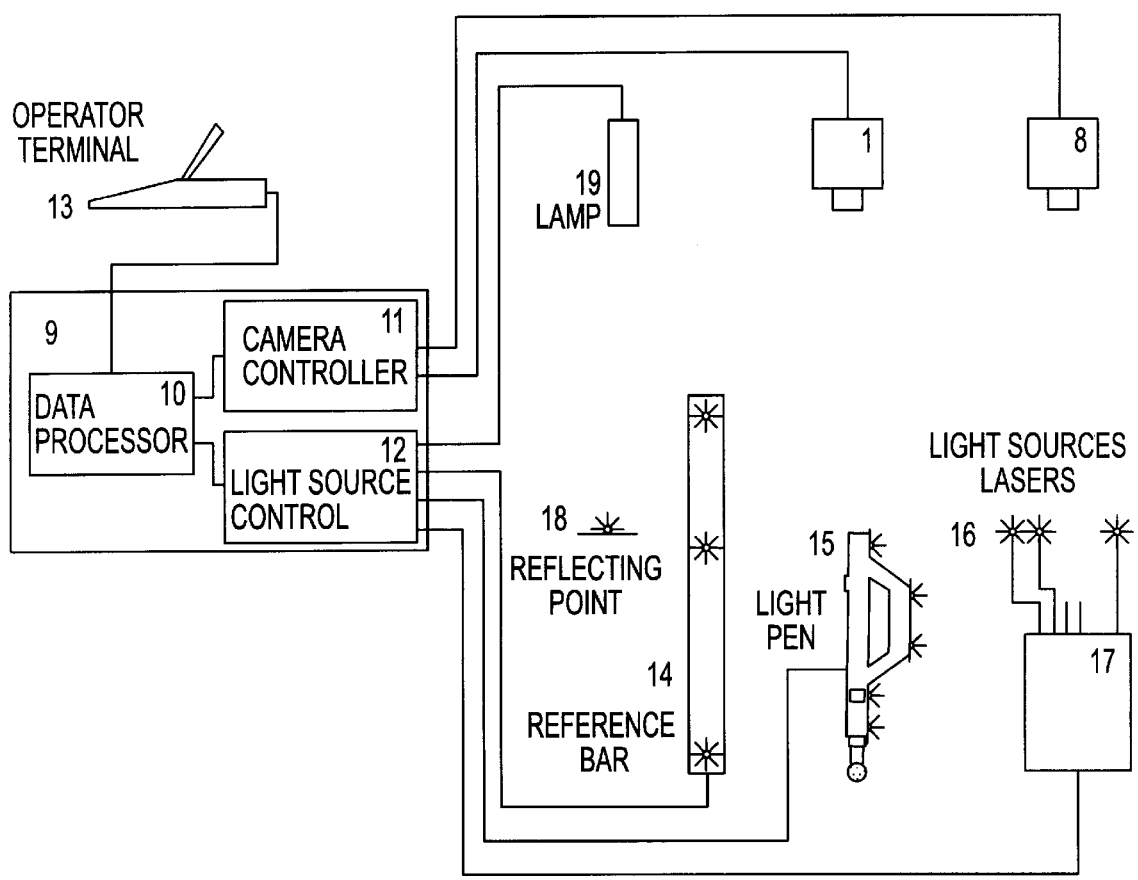
FIG. 3 illustrates the configuration of a complete measurement system according to the present invention.

The system known per se shown in FIG. 3 must, to cover the methods described above, be extended with respect to the data processor 10, the camera control unit 11 and the light source control unit 12. In this context it is required that these units shall be able to take into account:

different types and number of cameras, different types and number of light sources and help tools, different calculation methods depending on the configuration of cameras and light sources that are used and which type of known information (defined coordinate values in a local coordinate system or given distances between points) that should be included in the calculation.

Some examples of applications are described above. These shall be considered as examples only, as a large number of different other objects may be measured by the same methods and the same system. This includes large as well as small objects within automotive, aerospace or other mechanical industry.

We claim:

1. A method of determining the position and/or orientation of a number of objects relative to each other, the method comprising the steps of:

(A) providing at least two cameras;
   (B) establishing a network of help reference points;
   (C) determining the spatial positions of some points in the network relative to each other using at least one of the cameras positioned in multiple arbitrary locations, said at least one camera determining projections of the positions of said some network points;
   (D) positioning some of the cameras;
   (E) determining the positions and orientations of the some of the cameras using the spatial positions of network points determined in step (C); and
   (F) determining the position of some of the objects relative to each other, based on the determined positions and orientations of some of the cameras, whereby the position of at least one of the objects is determined by:

(i) holding a probing tool in contact with at least one point on the object, and
   (ii) obtaining measurement data from the probing tool using at least two of the cameras whose positions were determined in step (D).

2. The method as in claims 1, wherein the probing tool has a touch point and wherein step (F)(i) comprises the step of holding the touch point of the probing tool in contact with the point on the object.

3. The method as in claim 1, further comprising the steps of:

positioning at least one reference bar within a measurement volume containing the objects; and
   obtaining scale information from the reference bar.

4. The method of claim 1, wherein some of the network points are light sources, and wherein the step C of determining the positions comprises determined the positions of some of the light sources.

5. The method of claim 4 wherein the light sources are selected from a group consisting of active light sources and passive light sources.

6. The method of claims 5 wherein the active light sources are selected from a group consisting of permanently mounted light sources, projected light spots, and illuminated reflectors.

7. The method of claim 1, wherein the position of at least one of the points in the network is determined using the probing tool.

8. The method of claim 1 wherein the probing tool has light sources attached thereto.

9. The method of claim 8 wherein the light sources are selected from a group consisting of active light sources and passive light sources.

10. The method of claim 1, wherein the network includes at least two points having a known mutual separation distance, the method further comprising the step of using the two points to determine a correct length scale.

11. The method of claim 1 further comprising the step of:

determining optical lens distortions of at least one of the cameras based on observed projections of the network points.

12. The method of claim 1 wherein the positions of some of the points in the network define a coordinate system, and wherein step (F) determines the position of each object relative to the coordinate system.

13. The method of claim 1, wherein the network is established within a volume, the method further comprising the step of:

bringing objects within the volume prior to the step of determining their positions.

14. The method of claim 1 wherein the objects are used to locate and/or hold parts in a station in a manufacturing production line.

15. The method of claim 14, wherein the network is established on a moveable device, the method further comprising the steps of:

moving the movable device into the station before performing steps (E) and (F).

16. The method of claim 1, wherein the network is established on a moveable device, the method further comprising the steps of:

moving the movable device into each of a plurality of stations in a production line and then performing steps (E) and (F) in each of the stations.

17. A method according to claim 1, wherein the method operates relative to a defined coordinate system and wherein a minimum of three of the network points have at least one of their coordinate values known relative to the defined coordinate system such that a minimum of six coordinate values are known and distributed such that three values are defined relative to one coordinate axis of the defined coordinate system, two values are defined relative to a second coordinate axis of the defined coordinate system, and one value is defined relative to a third axis of the defined coordinate system, the method further comprising the step of:

calculating the positions and orientations of other points and geometrical objects relative to this defined coordinate system using the known coordinate values.

18. A method as in claim 1, further comprising the step of, prior to the step of determining the positions and orientations of some of the cameras:

locating at least two of the cameras such that their field of view includes at least three network points of known positions and an object whose position and/or orientation are to be determined.

19. A method of determining the position and/or orientation of a number of objects relative to each other, the method comprising the steps of:

(A) providing at least two cameras;

(B) establishing a network of help reference points, some of the reference points being light sources;

(C) determining the spatial positions of some points in the network relative to each other using at least one of the cameras positioned in multiple arbitrary locations, said at least one camera determining projections of the positions of said some network points, said determine being by:

(i) when the reference points are light sources, determining the projections of the light sources; and (ii) determining the projections of at least one of the points in the network using a probing tool having light sources attached thereto;

(D) positioning some of the cameras;

(E) determining the positions and orientations of the some of the cameras using the spatial positions of network points determined in step (C); and (F) determining the spatial position of each of the objects relative to each other, based on the determined positions and orientations of some of the cameras, whereby the position of at least one of the objects is determined by:

(i) holding a touch point of the probing tool in contact with at least one point on the object, and (ii) obtaining measurement data from the probing tool using at least two of the cameras whose positions were determined.

20. The method of claim 19, wherein the light sources are selected from a group consisting of active light sources and passive light sources.

21. A method of determining the position and/or orientation of a number of objects relative to each other, the method comprising the steps of:

(A) providing at least two cameras;

(B) providing a network of help reference points having known positions relative to each other;

(C) positioning some of the cameras;

(D) individually determining the positions and orientations of some of the cameras relative to each other and to the network points using the known positions of network points; and (E) determining the spatial positions of the objects relative to each other based on the known positions and orientations of some of the cameras, whereby the position of at least one of the objects is determined by:

(i) holding the probing tool in contact with at least one point on the object, and (ii) obtaining measurement data from the probing tool using at least two of the cameras whose positions were determined in step (D).

22. The method as in claim 21, wherein the probing tool has a touch point and wherein step (E)(i) comprises the step of holding the touch point of the probing tool in contact with the point on the object.

23. The method as in claim 21, further comprising the steps of:

positioning at least one reference bar within a measurement volume containing the objects; and obtaining scale information from the reference bar.

24. The method of claim 21, wherein some of the network points are light sources.

25. The method of claim 24, wherein the light sources are selected from a group consisting of active light sources and passive light sources.

26. The method of claims 25, wherein the active light sources are selected from a group consisting of permanently mounted light sources, projected light spots, and illuminated reflectors.

27. The method of claim 21, wherein the probing tool has light sources attached thereto.

28. The method of claim 27 wherein the light sources are selected from a group consisting of active light sources and passive light sources.

29. The method of claim 21, wherein the network includes at least two points having a known mutual separation distance, the method further comprising the step of using the two points to determine a correct length scale.

30. The method of claim 21, further comprising the step of:

determining optical lens distortions of one of the cameras based on observed positions of the network points.

31. The method of claim 21, wherein the positions of some of the points in the network define a coordinate system, and wherein step (E) determines the position of each object relative to the coordinate system.

32. The method of claim 21, wherein the network is established within a volume, the method further comprising the step of:

bringing objects within the volume prior to the step of determining their positions.

33. The method of claim 21, wherein the objects are used to locate and/or hold parts in a station in a manufacturing production line.

34. The method of claim 33, wherein the network is established on a moveable device, the method further comprising the step of:

moving the movable device into the station before performing steps (D) and (E).

35. The method of claim 21, wherein the network is established on a moveable device, the method further comprising the steps of:

moving the movable device into each of a plurality of stations in a production line and then performing steps (D) and (E) in each of the stations.

36. A method of determining the position and/or orientation of a number of objects relative to each other, the objects being used to locate and/or hold parts in a station in a manufacturing production line, the method comprising the steps of:

(A) providing at least two cameras;

(B) providing a network of help reference points on a moveable device;

(C) determining the spatial positions of some points in the network relative to each other using at least one of the cameras positioned in multiple arbitrary locations, said at least one camera determining projections of the positions of said some network points;

(D) moving the movable device into the station;

(E) positioning some of the cameras;

(F) determining the positions and orientations of some of the cameras using the spatial positions of network points determined in step (C); and (G) determining the spatial position of some of the objects relative to each other, based on the determined positions and orientations of some of the cameras, whereby the position of at least one of the objects is determined by:
  (i) holding a probing tool in contact with at least one point on the object, and
  (ii) obtaining measurement data from the probing tool using at least two of the cameras.

37. The method as in claim 36, wherein the probing tool has a touch point and wherein step (G)(i) comprises the step of holding the touch point of the probing tool in contact with the point on the object.

38. A method of determining the position and/or orientation of a number of objects relative to each other, the objects being used to locate and/or hold parts in a station in a manufacturing production line, the method comprising the steps of:

(A) providing at least two cameras;

(B) providing a network of help reference points having known spatial positions relative to each other on a moveable device;

(C) moving the movable device into the station;

(D) positioning some of the cameras;

(E) determining the positions and orientations of the some of the cameras using the known spatial positions of network points; and (F) determining the spatial position of some of the objects relative to each other, based on the determined positions and orientations of some of the cameras, whereby the position of at least one of the objects is determined by:
  (i) holding the probing tool in contact with at least one point on the object, and
  (ii) obtaining measurement data from the probing tool using at least two of the cameras whose positions were determined in step (D).

39. The method as in claim 38, wherein the probing tool has a touch point and wherein step (F)(i) comprises the step of holding the touch point of the probing tool in contact with the point on the object.

40. A method of determining the position and/or orientation of a number of objects relative to each other, said objects being used to locate and/or hold parts in a plurality of stations in an automobile manufacturing production line, the method comprising the steps of:

(A) providing at least two cameras;

(B) establishing a network of help reference points on a movable device;

(C) determining the spatial positions of some points in the network relative to each other based on projections of said some points obtained by using at least one of the cameras positioned in multiple arbitrary locations;

(D) moving the movable device into each of the plurality of stations and, in each of the stations, (E) positioning some of the cameras;

(F) determining the positions and orientations of the some of the cameras using the spatial positions of network points determined in step (C); and (G) determining the spatial position of some of the objects relative to each other, based on the determined positions and orientations of some of the cameras, whereby the position of at least one of the objects is determined by:
  (i) holding a probing tool in contact with at least one point on the object, and
  (ii) obtaining measurement data from the probing tool using at least two of the cameras whose positions were determined in step (E).

41. A method as in any of claims 1, 19, 21, 36, 38 or 40, wherein step (B) comprises the step of establishing the network of help reference points at locations spaced apart from the probing tool and any of the objects.

42. A method as in claim 41, wherein said objects include:
  (a) geometric objects selected from a group consisting of planes, lines, holes, cylinders, spheres, and
  (b) combined objects selected from a group consisting of robot arms and industrial production equipment.

43. A method as in any of claims 1, 19, 21, 36, 38 or 40 wherein step (B) comprises the step of establishing at least one the help reference points at a location apart from the probing tool and any of the objects.

44. A method as in claim 43, wherein said objects include:
  (a) geometric objects selected from a group consisting of planes, lines, holes, cylinders, spheres, and
  (b) combined objects selected from a group consisting of robot arms and industrial production equipment.

45. A method as in any of claims 1 or 19 wherein the cameras used in step (C) are the same as the cameras used in step (D).

46. A method as in claim 45, wherein said objects include:
  (a) geometric objects selected from a group consisting of planes, lines, holes, cylinders, spheres, and
  (b) combined objects selected from a group consisting of robot arms and industrial production equipment.

47. A method as in any of claims 36 or 40, wherein the cameras used in step (C) are the same as the cameras used in step (E).

48. A method as in claim 47, wherein said objects include:
  (a) geometric objects selected from a group consisting of planes, lines, holes, cylinders, spheres, and
  (b) combined objects selected from a group consisting of robot arms and industrial production equipment.

49. A method as in one of claims 1–40, wherein said objects include:
  (a) geometric objects selected from a group consisting of planes, lines, holes, cylinders, spheres; and
  (b) combined objects selected from a group consisting of robot arms and industrial production equipment.

* * * * *

UNITED STATES PATENT AND TRADEMARK OFFICE
CERTIFICATE OF CORRECTION

PATENT NO. : 5,805,287 C1
DATED : August 13, 2002
INVENTOR(S) : Pettersen et al.

It is certified that error appears in the above-identified patent and that said Letters Patent is hereby corrected as shown below:

<u>Title page,</u>
Item [30], should read:

-- [30] Foreign Application Priority Data
May 24, 1993 (NO) .....................931873
May 24, 1994 (PCT)....................PCT/NO94/00096 --

Signed and Sealed this

Twelfth Day of August, 2003

JAMES E. ROGAN
*Director of the United States Patent and Trademark Office*

(12) REEXAMINATION CERTIFICATE (4628th)
United States Patent
Pettersen et al.

(10) Number: US 5,805,287 C1
(45) Certificate Issued: Aug. 13, 2002

(54) METHOD AND SYSTEM FOR GEOMETRY MEASUREMENTS

(75) Inventors: Alf Pettersen, Gjettum; Øyvind Røtvold, Hvalstad, both of (NO)

(73) Assignee: Metronor AS, Nesbru (NO)

Reexamination Request:
No. 90/005,370, May 25, 1999
No. 90/005,519, Sep. 28, 1999

Reexamination Certificate for:
Patent No.: 5,805,287
Issued: Sep. 8, 1998
Appl. No.: 08/769,800
Filed: Dec. 17, 1996

Related U.S. Application Data

(63) Continuation of application No. 08/373,253, filed on Jan. 23, 1995, now abandoned.

(30) Foreign Application Priority Data

May 24, 1993 (NO) .................................................. 931873

(51) Int. Cl.[7] ............................................. G01B 11/14
(52) U.S. Cl. ..................................................... 356/614
(58) Field of Search ........................... 356/375, 141.1; 306/152.1–152.3, 3.01–5.15, 376; 33/502, 503, 504, 554, 555, 556

(56) References Cited

U.S. PATENT DOCUMENTS

| | | | |
|---|---|---|---|
| 4,396,945 A | * | 8/1983 | DiMatteo et al. |
| 4,402,608 A | | 9/1983 | DiMatteo et al. |
| 4,928,175 A | | 5/1990 | Haggren |
| 5,196,900 A | | 3/1993 | Pettersen |
| 5,440,392 A | | 8/1995 | Pettersen et al. |
| 5,622,170 A | | 4/1997 | Schultz |

FOREIGN PATENT DOCUMENTS

| | | | |
|---|---|---|---|
| DE | 4124174 | * | 9/1992 |
| WO | WO 91/16598 | | 4/1991 |

OTHER PUBLICATIONS

"Mapvision: The Photogrammetric Machine Vision System," H. Haggrén and E. Leikas, *Photogrammetric Engr. and Remote Sensing* 53 (8), 1103–8, 1987.

"A Cine–Photogrammetric System for the Monitoring of a Dynamic Event Underwater," C. S. Fraser and R. L. Denham, *Photogrammetric Engr. and Remote Sensing* 54 (10), 1403–7, 1988.

"State of the Art in Industrial Photogrammetry," Fraser, C.S., IAPRS, V, 27, ISPRS, 1988, B5, Commision V, pp. 166–181.

(List continued on next page.)

*Primary Examiner*—Karl D. Frech

(57) ABSTRACT

A method and system for determining the position and/or orientation of a number of objects relative to each other. At least two cameras having electro-optical sensors are provided. A network of help reference points is established. The positions of some points in the network relative to each other can be known or they are determined using at least one of the cameras positioned in multiple arbitrary locations. The positions of some of the objects relative to each other, are determined based on the determined positions of some of the points in the network. The position of at least one of the objects is determined by holding a probing tool in contact with a point on the object, and obtaining measurement data from the probing tool using at least two of the cameras.

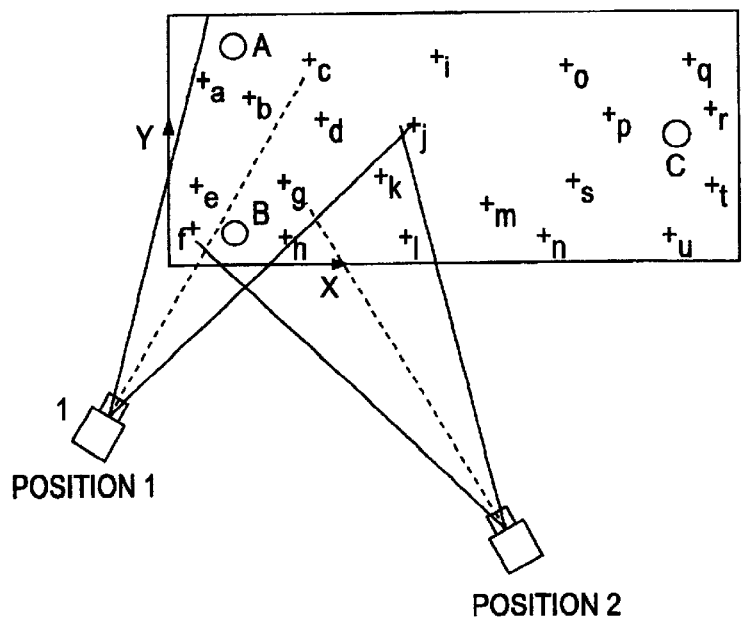

OTHER PUBLICATIONS

Non-Topographic Photogrammetry, 2E, H. M, Karara (Ed.), Am. Soc. Photogrammetry and Remote Sensing, Falls Church, Va., 1989; Chap. 2, Mikhail; Chap. 3, Atkinson; Chap. 4, McGlone et al.; Chap. 5, Fryer; Chap. 6, Faig; Chap. 10, Rüther; Chapter 11, Newton; Chap. 17, El–Hakim et al.; and Chap. 20, Adams.

"Concept of an Optical Coordinate Measurement Machine," C.-T. Schneider and K. Sinnreich, SPIE 1395, 816–22, 1990.

"A Resume of Some Industrial Applications of Photogrammetry," Fraser, C.S., Invited Paper to the $1^{st}$ Australian Photogrammetric Conference, Sydney, Nov. 7–9, 1991.

"Optical 3–D–Measurement Systems for Quality Control in Industry," C.-T. Schneider and K. Sinnreich, *Intl. Arch. Photogrammetry and Remote Sensing* 29 (B5), 56–59, 1992.

"A Video–Based Industrial Measurement System," P. C. Gustafson and H. B. Handley, *Intl. Arch. Photogrammetry and Remote Sensing* 29 (B5), 501–6, 1992.

"Single Camera System for Close Range Industrial Photogrammetry," K. Åmdal, *Intl. Arch. Photogrammetry and Remote Sensing* 29 (B5), 6–10, 1992.

"Calibration and Accuracy Assessment of a Multi–Sensor Online Photogrammetric System," Godding, R. & Luhmann, T., *Intl. Arch. Photogrammetry and Remote Sensing* 29 (B5) 24–29, 1992.

"Metrology Norway System—Optimum Accuracy Based on CCD Cameras," A. Pettersen, *Intl. Arch. Photogrammetry and Remote Sensing* 29 (B5), 230–233, 1992.

"The Programmable Optical 3D Measuring System—Application and Performance," Loser, R. & Luhmann, T., IAPRS, 29, (B5), 533–540, 1992.

"Metrology Norway System—An On–line Industrial Photogrammetry System," Petterson, A., *Intl. Arch. Photogrammetry and Remote Sensing* 29 (B5), 43–49, 1992.

Axelsson, "Real–Time Photogrammetric Systems—Who are the Developers?" IAPRS, vol. 29, ISPRS 1992 part B5 pp. 674–682.*

Kyle, "Non–Contact Measurement for Robot Calibration", CIM–Europe 92, $8^{th}$ Annual Conf. Workshop on Robot Calibration, 1992.*

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–49 is confirmed.

* * * * *